(12) United States Patent
    Labrecque et al.

(10) Patent No.: US 9,877,463 B2
(45) Date of Patent: Jan. 30, 2018

(54) PIGLET DRYING APPARATUS

(71) Applicant: Conception Ro-Main Inc., St. Lambert-de-Lauzon (CA)

(72) Inventors: Germain Labrecque, St-Bernard (CA); Jacquelin Labrecque, St-Bernard (CA); Rudy Cabrera, Jr., St-Narcisse-de-Beaurivage (CA)

(73) Assignee: Conception Ro-Main Inc., St. Lambert-de-Lauzon, QC (CA)

( * ) Notice: Subject to any disclaimer, the term of this patent is extended or adjusted under 35 U.S.C. 154(b) by 19 days.

(21) Appl. No.: 15/209,030

(22) Filed: Jul. 13, 2016

(65) Prior Publication Data

US 2017/0112094 A1    Apr. 27, 2017

Related U.S. Application Data

(63) Continuation-in-part of application No. 14/798,583, filed on Jul. 14, 2015.

(51) Int. Cl.
*A01K 1/02* (2006.01)
*A01K 13/00* (2006.01)
*A01K 1/00* (2006.01)

(52) U.S. Cl.
CPC .......... *A01K 13/001* (2013.01); *A01K 1/0052* (2013.01); *A01K 1/0076* (2013.01); *A01K 1/0218* (2013.01)

(58) Field of Classification Search
CPC ... A01K 1/0218; A01K 13/001; A01K 1/0227
USPC ....... 119/452, 673, 677, 678, 601, 602, 668, 119/508, 503, 606, 608
See application file for complete search history.

(56) References Cited

U.S. PATENT DOCUMENTS

| | | | | |
|---|---|---|---|---|
| 1,230,237 | A | * | 6/1917 | Sturm .................. A01K 1/0218 119/507 |
| 1,439,157 | A | * | 12/1922 | Ford ..................... A01K 5/025 119/446 |
| 1,875,433 | A | * | 9/1932 | Fitzpatrick ............... A01K 1/02 119/498 |

(Continued)

FOREIGN PATENT DOCUMENTS

| CA | 1182005 | 2/1985 |
|---|---|---|
| CA | 2076739 | 2/1994 |

(Continued)

*Primary Examiner* — Yvonne Abbott-Lewis
(74) *Attorney, Agent, or Firm* — Adrian D. Battison; Ade & Company Inc; Ryan W. Dupuis

(57) ABSTRACT

An apparatus for drying piglets immediately after birth includes a container shaped and arranged for receiving up to three or four of the piglets having an opening arrangement for manual insertion by the worker of the piglets to be confined within the container during a drying period. The container has a system for applying air movement and optionally heat to the piglets while confined with the container for drying and a release arrangement having a door controlled by a settable timer or a system for detecting when the piglets are dry for allowing release from the container of the piglets after a sufficient drying time period has elapsed. The container includes a base mounted in each farrowing crate and a cover portion which is removable from one crate to another.

22 Claims, 11 Drawing Sheets

(56) References Cited

U.S. PATENT DOCUMENTS

| | | | | |
|---|---|---|---|---|
| 3,028,097 A * | 4/1962 | Johnson | A01K 1/0218 | 119/307 |
| 3,175,534 A * | 3/1965 | Pollard | A01K 13/001 | 119/174 |
| 3,181,503 A * | 5/1965 | Tripp | A01K 1/0218 | 119/508 |
| 4,292,927 A * | 10/1981 | Sassmann | A01K 1/0047 | 119/448 |
| 4,314,410 A * | 2/1982 | Nichols | A01K 13/001 | 119/452 |
| 4,348,986 A * | 9/1982 | Marrs | A01K 1/0218 | 119/508 |
| 4,462,335 A * | 7/1984 | Ahrens | A01K 1/0218 | 119/445 |
| 4,462,336 A * | 7/1984 | Kawakami | A01K 1/015 | 119/503 |
| 4,471,719 A * | 9/1984 | Thomson | A01K 1/0218 | 119/446 |
| 4,478,175 A * | 10/1984 | Fisher | A01K 1/0227 | 119/448 |
| 4,559,903 A * | 12/1985 | Bloom | A01K 13/001 | 119/416 |
| 4,793,287 A * | 12/1988 | Hofmann | A01K 1/0218 | 119/505 |
| 5,140,947 A * | 8/1992 | Bruce | A01J 7/04 | 119/502 |
| 5,283,962 A * | 2/1994 | Humann | A01K 13/001 | 119/482 |
| 5,372,091 A * | 12/1994 | Rhodes | A01K 1/0218 | 119/505 |
| 5,622,138 A * | 4/1997 | Underhill | A01K 1/0218 | 119/503 |
| 5,832,875 A * | 11/1998 | Van Gilst | A01K 1/0158 | 119/508 |
| 6,439,165 B1 * | 8/2002 | Guard | A01K 1/0035 | 119/496 |
| 6,826,850 B2 * | 12/2004 | Jewell | A01K 13/001 | 34/202 |
| 7,165,509 B2 * | 1/2007 | Bryant | A01K 1/0218 | 119/446 |
| 7,921,813 B2 * | 4/2011 | Denison | A01K 13/001 | 119/600 |
| 8,098,163 B2 * | 1/2012 | Labrecque | A01K 1/0218 | 119/508 |
| D653,818 S * | 2/2012 | Schetlin | D30/158 | |
| 8,186,307 B2 * | 5/2012 | Moharram | A01K 13/001 | 119/651 |
| 8,757,096 B2 * | 6/2014 | Doumas | A01K 13/001 | 119/606 |
| 9,451,758 B2 * | 9/2016 | Kaneda | A01K 13/001 | |
| 2004/0025365 A1 | 2/2004 | Jewell | | |
| 2007/0221137 A1* | 9/2007 | Lareau | A01K 1/0218 | 119/503 |
| 2007/0262859 A1* | 11/2007 | Henry | A01K 1/0218 | 340/539.11 |

FOREIGN PATENT DOCUMENTS

| | | |
|---|---|---|
| CA | 2620523 | 7/2008 |
| EP | 0513981 | 11/1992 |
| GB | 2034568 | 6/1980 |
| WO | WO0230179 | 4/2002 |
| WO | WO2006127110 | 11/2006 |

* cited by examiner

PIGLET DRYING APPARATUS

This application is a continuation in part of application Ser. No. 14/798,583 filed Jul. 14, 2015.

This invention relates to an apparatus for use a method for raising piglets where one or more piglets are dried immediately after birth.

BACKGROUND OF THE INVENTION

Newborn piglets are covered with amniotic fluid. When drying, the amniotic fluid leaves a fibrous layer of skin that is then removed by contact between the animal and its environment. Until it is completely removed, this skin makes the complete drying of the animal very difficult. A wet piglet loses a lot of energy to maintain its body temperature during the evaporation process and often weakens to a point where it struggles in its search for the nipples. It is very important that each piglet feeds as early as possible after birth to receive an appropriate amount of colostrum which plays a very important role in its early development. In fact, colostrum promotes proper development of its immune system, not to mention it also provides energy.

To accelerate the drying process, some pig producers manually dry every single piglet with a towel. However, this practice is not widespread essentially because it is time-intensive. Other drying techniques are much less time consuming for the user since they are done without the constant input from the worker. These techniques include natural or synthetic drying powders, infrared heating, heating mats, etc. However their drying efficiency is much less than doing it manually.

Newborn piglets are very lethargic at farrowing. It takes a few minutes before they wake up and start their search for feed (nipples). Waking them up gently can accelerate this process.

Smaller, weak, and frail piglets usually get cold at birth and if left unattended, this may lead to what is called the vicious cycle of morbidity. As soon as the piglets get too cold, they will look to rest at a warm area or better yet huddle with its litter mates. This instinctive reaction delays the first feeding which prevents them from ingesting their share of the limited amount of colostrum. Furthermore, chilling predisposes these piglets to disease as well as crushing.

SUMMARY OF THE INVENTION

It is one object of the invention to provide an apparatus or method that can rapidly and efficiently dry the newborn piglets, wake them up comfortably, and orient them towards the nipples so that the time interval between farrowing and first feeding is decreased.

According to one definition of the invention there is provided an apparatus for using in raising piglets comprising:

a container shaped and arranged for receiving one of more piglets;

the container having an opening arrangement for insertion of said one or more piglets to be confined within the container;

the container having an air movement system and optionally heating system for applying drying air to said one or more piglets within the container sufficient to cause drying of the piglets from the wet condition;

the container being arrange to maintain said one or more piglets confined with the container temporarily until substantially dried from the wet condition.

An automated drying system of this type can therefore both reduce the number of deaths of piglets who are too weak to survive the above problems and in addition can improve growth even in the stronger piglets who would in any event survive, since they are encouraged by the drying action to start feeding earlier.

Preferably after the drying action is complete, the piglet is released from the container.

The release may be by way of an action of the control system to open a release door or opening or in an alternative simplified arrangement, the piglets may be removed manually by the worker who may also simply manually switch off the drying action.

The time period of the drying action may be controlled by a timer which approximates the drying time required or could also be determined by sensor which uses humidity or other parameters to actually detect the amount of drying which has occurred. That is the sensor acts to detect a condition after sufficiently drying the one or more piglets.

That is a system without a controller such as with a simple ON/OFF drying switch can also be used in this concept.

The drying container in order to provide a drying action within a temporary time period is arranged preferably for optimizing variables to optimize drying air velocity, temperature, humidity.

This arrangement can be used in conjunction with a system in which there is provided a compartment at a level below the pen floor in which piglets slide after birth and which protects them until they are ready to return to the pen to access the sow. Thus in the present arrangement, the piglets can automatically enter the drying device and are allowed to leave only once they are dry. The system can include a detector which operates to start automatically as the piglets enter.

The arrangement can include detectors which carry out an analysis of system variables to determine when piglets are completely dry to stop the drying process instead of a timer.

The arrangement can include a closed-loop system to manage and optimize the drying process variables (power to heater, fan speed, etc.) in reaction to input variables (temperature, humidity, air speed, etc.) instead of pre-determined conditions The arrangement can include a heat exchanger or air mixer to increase heating efficiency.

In order to ensure that the piglet or piglets are maintained within the enclosure until they are dried, preferably the container includes an opening closable by a closure member for release of the piglets. The closure member is preferably held closed and the container includes a latch operable on the closure member when the piglets are dried for release of the piglets.

While the closure member for release of the piglets can be provided at any location on the container such as after one wall, preferably the closure member comprises a floor panel which is hinged at one side and lowered to the floor of the farrowing pen at the end of the drying period to allow the release of the piglet. In this way the container can be located in the farrowing pen at a height spaced from the floor of the following pen so that it is at a convenient height to enable the worker to place the piglets in the container through an upper opening while the piglets are lowered to the ground without damage by the lowering of the floor panel. The presence of the container within the farrowing pen at a height spaced above the floor therefore leaves the floor open for the remaining piglets to take their place on the piglets area without interference from the container.

In order to ensure that the piglets are warmed to their proper body temperature before leaving the container, preferably the container includes a radiant heating member for applying radiant heat to said one or more piglets within the container. That is, at the end of the drying cycle the air movement is turned off and the piglets remain in the container while radiant heat is applied. The tendency is for the piglets to be significantly cooled by the air movement and by the convection effect of the drying action while the air movement continues to dry the piglets. The addition of heat to the air as it is blown across the piglets does not significantly increase the drying efficiency or reduce the drying time. It is not necessary therefore that heat should be applied to the air as it is blown across the piglets. The radiant heat can be used during the drying action to try to maintain the body temperature but more importantly the radiant heat is used after the drying is complete to reheat the piglet to raise its body temperature to a normal temperature. Thus the control system which operates the drying action provides a timer which operates the air movement or fan for a predetermined time period, following which the radiant heat is applied for a subsequent time period, following which the closure member, such as the floor panel, can be opened to release the piglet.

In this way, preferably the radiant heating member is arranged to apply said radiant heat to said one or more piglets in the container after the air movement is halted.

In this way, preferably the radiant heating member is arranged to apply said radiant heat to said one or more piglets in the container and the air in the air movement is un-heated.

To provide effective drying action, preferably the air movement system comprises at least one nozzle arranged for directing air across the container at a height to intersect the piglets on a floor of the container. In this way, with the piglets standing on the floor of the container or lying on the floor of the container, the air movement provides an airflow across the body of the piglet. The airflow is sufficiently rapid that the air movement is uncomfortable to the piglet in its stage immediately after the so that the piglet tends to move within the container to try to escape the air movement. This movement of the piglet typically asked to turn the body of the piglet relative to the airflow so that the drying action occurs across the full body surface. Therefore without moving the airflow nozzle, a drying action across the full surface area of the piglet come be obtained.

In order to maximize drying action, preferably there is provided at least two nozzles arranged at different heights relative to the floor. This is particularly effective where the nozzle preferably comprises a slot extending across an upstanding wall of the container. In this way the airflow is provided as two blades of airstream across the container and different heights to dry different areas of the piglet body. While the nozzles come be provided in one sidewall, preferably the nozzles are arranged in opposite side walls so as to access the piglet body from both sides. This high-speed drying action, together with the movement of the piglet to try to avoid the uncomfortable airflow and shows that the whole of the body of the piglet receives the airflow to provide the best overall drying action.

As some of the fluid on the body of the piglet may collect on the floor of the container due to contact, preferably the container includes a perforated floor such that the air movement exits through the floor and acts to dry the floor. Without this drying action on the floor, it is possible that the floor can become wet and slippery with the possibilities for damage to the piglet by falling. The injected into the container therefore escapes after passing over the body of the piglet downwardly through the preparations in the floor to carry the moisture off the piglet and out of the container the container remained dry and clean.

While the above arrangements provide a preferable construction for the container which avoids the necessity for both heating of the air and for movement of the nozzle injecting the air into the container, other arrangements may use an air drying action which incorporates heating of the air and movement of the nozzle. Such heating does not necessarily increase the rate of drying nor does it necessarily keep the piglet at a warm body temperature. Depending on the amount of heat applied to the air stream, the air may keep the piglet at a warm body condition, but it is not energy-efficient to do this and hence arrangements of this type are not preferred in the present invention. It is important but not essential that a heating effect be applied to the piglet before release to ensure that it is at a desirable body temperature. It is known that piglets that are too cool will firstly attempt to warm their body temperature by accessing a source of heat such as of the piglets. However it is more important that the initial requirement of the piglet is to access feed rather than warmth in order that the feeding action commences as soon as possible. This advantage of the drying action provides an important improvement leading to efficiency of initial growth of the piglet after birth.

According also to the invention herein there is provided a farrowing apparatus for use in raising piglets comprising:

a frame arrangement for retaining a sow in a farrowing area;

and an apparatus as defined above.

Preferably the container includes support components or hangers by which it can be mounted in the selected one of the farrowing pens at a position spaced from a floor of the pen and a floor panel of the container is openable to lower said one or more piglets to the floor of the frame arrangements. In this way the worker can carry the container providing the drying action from one pen to another during the birthing process as required. The container can be simply hung over a top rail of the farrowing pen with the top cover panel for the bull by the worker to place the piglet in the container. The floor panel when opened after the drying action lowers the piglets or piglets to the floor.

The above arrangement provides a simple construction which uses preferably a timing action for the air movement and for the radiant heat dry out. This arrangement is all they simple mechanical nature where the control uses limited input information. However more complicated systems can be developed which use humidity and other sensors for detecting other information to control the drying action. In this way the timing of the drying action can be better controlled to ensure full drying of the piglet or piglets regardless of the number of piglets in the container.

While the dryer is proposed for use generally in farrowing area that is a barn or other area set up for farrowing sows, it is not necessarily mounted directly inside a single farrowing pen or crate but could be placed on top of the stall or at some other suitable location. Obviously, if not located on or at the floor of the pen, this would not allow a door to be opened to simply release and orient the piglets toward the nipples but this feature is not essential.

As used herein the definition of a container is something to contain the piglets and that it can be anything that restricts the piglets from escaping until they are dry. For example, a ventilation and heating system could be installed in a creep assembly with some gates to keep the animals in until they are dry. This is included herein so that the definition of a container is something to "contain". The container does not need to be fully enclosed or to be manufactured as an integral device since any system that contains or confines the animal for the period of its drying action can be included.

As described in more detail hereinafter, the preferred arrangement provides a box in which up to three or four piglets can be placed at the same time. Other arrangements could allow more than 4 piglets. The objective is to dry all the newborn piglets at the same time when the worker sees them. Usually, not more than 3-4 piglets are delivered at a time and a timely (every 15-20 minutes) observation allows the worker to retrieve them. A preferred use of the drying device herein is to use it each time one or more newborn piglets are found.

In some cases, a heating device (convective and/or radiant and/or conductive) can be provided to control the enclosed air temperature and the piglet surface temperature, optimizing the evaporation rate and keeping the piglet comfortable which is an important factor. A simple cold air velocity acts to dry the piglets but it is desirable to ensure that they are comfortable. This would cause a stress which should be avoided. Also, it is important to understand that rising the piglet's skin temperature make sure they don't use their energy to heat up their body to reach a comfortable temperature.

A preferred configuration maximizes energy efficiency by having a heat exchanger system or a mixer to pre-heat incoming air with the hot air exhausted from the drying device.

A fan creating an air flow in and out of the box is provided to maximize drying. Moreover, the fan is arranged so that the air velocity and turbulence act to break the thin skin layer and thus remove it faster than contact with the environment. This also can act to wake up the piglet and make them ready sooner to follow their next instinct of looking for the teat to obtain nutrient.

A preferred design is arranged to let enough air to enter the box such that the relative humidity is kept at a level at which evaporation is good while minimizing the air flow rate to minimize energy consumption to keep the environment inside the box at an optimized temperature for both drying and piglet comfort.

A preferred configuration has a door that automatically unlocks when the drying process is over where this door can simply unlock so that the piglets can open it by themselves. However, more preferably, an automatically opening door (spring loaded or other type of actuator) is provided.

Preferably the outlet, as the piglet escapes the door, is arranged so that the piglet is directed towards the sow's teats.

The system preferably includes an automatic controller (closed-loop control system) that adjusts system variables (power to heater, fan speed, etc.) in real time to account for variation in controlled variables that can influence the rate of evaporation from the body of the piglet (inside humidity, temperature, air velocity, etc.).

A preferred configuration has a pre-set timer that stops the system automatically when the piglets are dry.

A preferred configuration has different modes to take into account the number and/or size of piglets to dry. Each mode is simple to activate and starts the system with the proper configuration to efficiently dry the piglets.

One frame of the device should be found in each pen to eliminate cross-contamination between pens. To reduce costs for the pig producer, the electromechanical parts of the device (fans, heaters, controllers, etc.) can be easily removed and used by simply coupling them to another frame in another pen. The frame preferably consists of a floor on which the animals will stand and at least two walls to enclose the animals and drying environment. The best would be four walls thus fully confining the piglets, but the number of walls can be varied and might change to less and also to no walls.

The rate of evaporation can be increased by adding a mixing fan inside the device to increase air speed at the surface of the animal, thus increasing rate of evaporation.

While manual insertion of the piglets is preferred, an alternative arrangement which reduces worker participation can include a funnel to guide piglets into the box without intervention and automatic control by which, upon sensing the presence of a piglet, the drying components is activated automatically and begins drying the piglets as they enter.

The drying device can be integrated into a complete farrowing pen solution.

The frame can include a see-through cover to allow the worker to observe the drying process and intervene if necessary.

The apparatus may include the following features:
should be easy to use and energy efficient.
preferably works on electrical power.
preferably provides sufficient drying action so that the piglets are dried in less than 5 minutes.
is arranged so that the piglets inside the box wake up due to air velocity and/or heat.
the housing is arranged so that it fits in a farrowing pen, preferably at the back of it.
an outlet door is preferably directed towards the nipples of the sow. As soon as the piglet is dry and awake, it is more active in searching the nipples. Therefore, opening the door in the direction of the nipples increases the chances of it finding them.
the housing is arranged so that it is easy to wash and disinfect. This can imply a modular design of the system allowing users to remove components for servicing without fear of damaging the product.

The housing is preferably modular so that the heating and ventilation components are a detachable compartment that can be easily removed, taken to a new location and re-fastened. This compartment can be coupled with a removable cover and door sub-assembly that may simply be installed on top of the frame. The use of a cover only is the preferred solution. It is however important that the electromechanical components should be easily moved from one frame assembly to the other so that the producer needs less electromechanical assemblies because they would be the most expensive parts. All sows do not farrow at the same moment so this assembly can be moved to a sow starting farrowing after the farrowing of another sow Preferably, the materials in contact with the animals are antibacterial.

Preferably, the floor surface is non-skid so that animal can easily stand without slipping bearing in mind that that they are very fragile at this age.

Preferably, there is a window or transparent section through the device so that the worker can see what is happening inside.

Preferably, the device is made of thermally insulating material to maximize energy efficiency.

The arrangement disclosed herein may provide one or more of the following additional benefits:
Drying all the piglets prevents the floor from being slippery (much dryer environment) and thus makes it easier and safer for the piglets to move around.

Piglets can seem weak at birth for many reasons one of which is being subject to a colder environment. Drying all the piglets eliminates this last factor and makes it easier to identify the real cause of weakness.

The arrangement disclosed herein may provide one or more of the following additional features:

The whole system should be easy to transfer from one side of the farrowing pen to the other. This pertains to the sow's natural behavior of switching sides during farrowing. When newborn piglets are found, the user should place the device on one side or the other according to the orientation of the sow at that moment.

there can be provided an arrangement to integrate an additional drying agent. For example, the drying agent could be powdered automatically on the piglets. It could also be spread on the floor to make it non-slippery and help to dry the piglets.

The controller may be arranged to monitor one or multiple system variables to analytically determine when the piglets are dry and automatically stop the device.

the electromechanical components can be arranged so that they can be easily moved from one frame assembly to the other so that the producer needs less electromechanical assemblies because they will be the most expensive parts. All sows do not farrow at the same moment so this assembly can be moved from the pen of a sow that is finished farrowing to a sow that is starting farrowing.

The top assembly can be lifted as a whole for insertion of piglets or may have a door through which the piglets can be inserted.

The drying device is not intended to be a heated comfort zone for the piglets. Its main purpose is to dry them comfortably, raise and keep their body temperature at an optimal level, and direct them to the nipples. Piglets may choose to stay inside the device. In such cases, the worker would remove and direct them manually to the nipples before putting newborn ones inside for drying.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
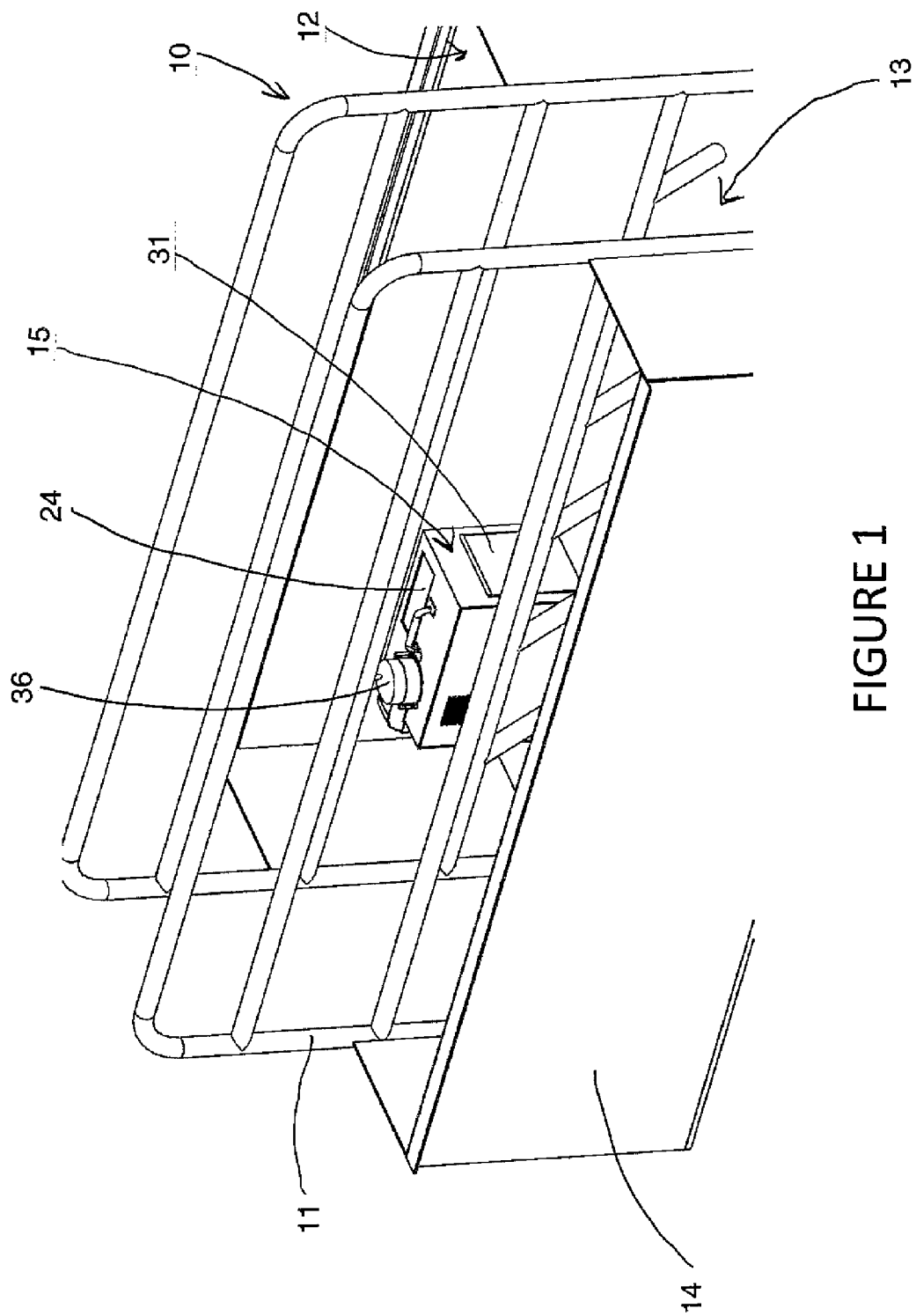
FIG. 1 is an isometric view of a farrowing crate including a drying system according to the present invention.
Figure 2:
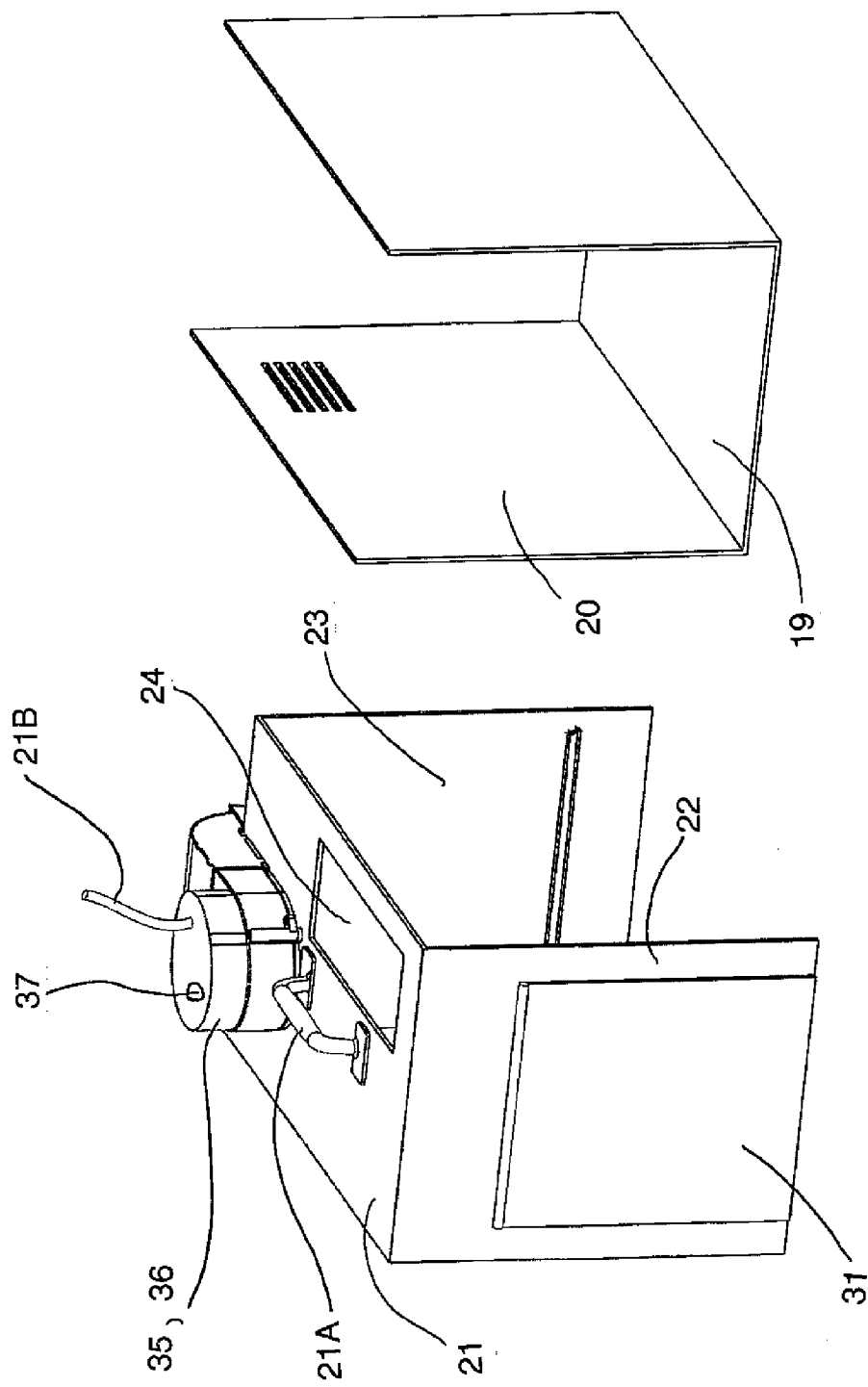
FIG. 2 is an isometric view of the dryer components of FIG. 1.
Figure 3:
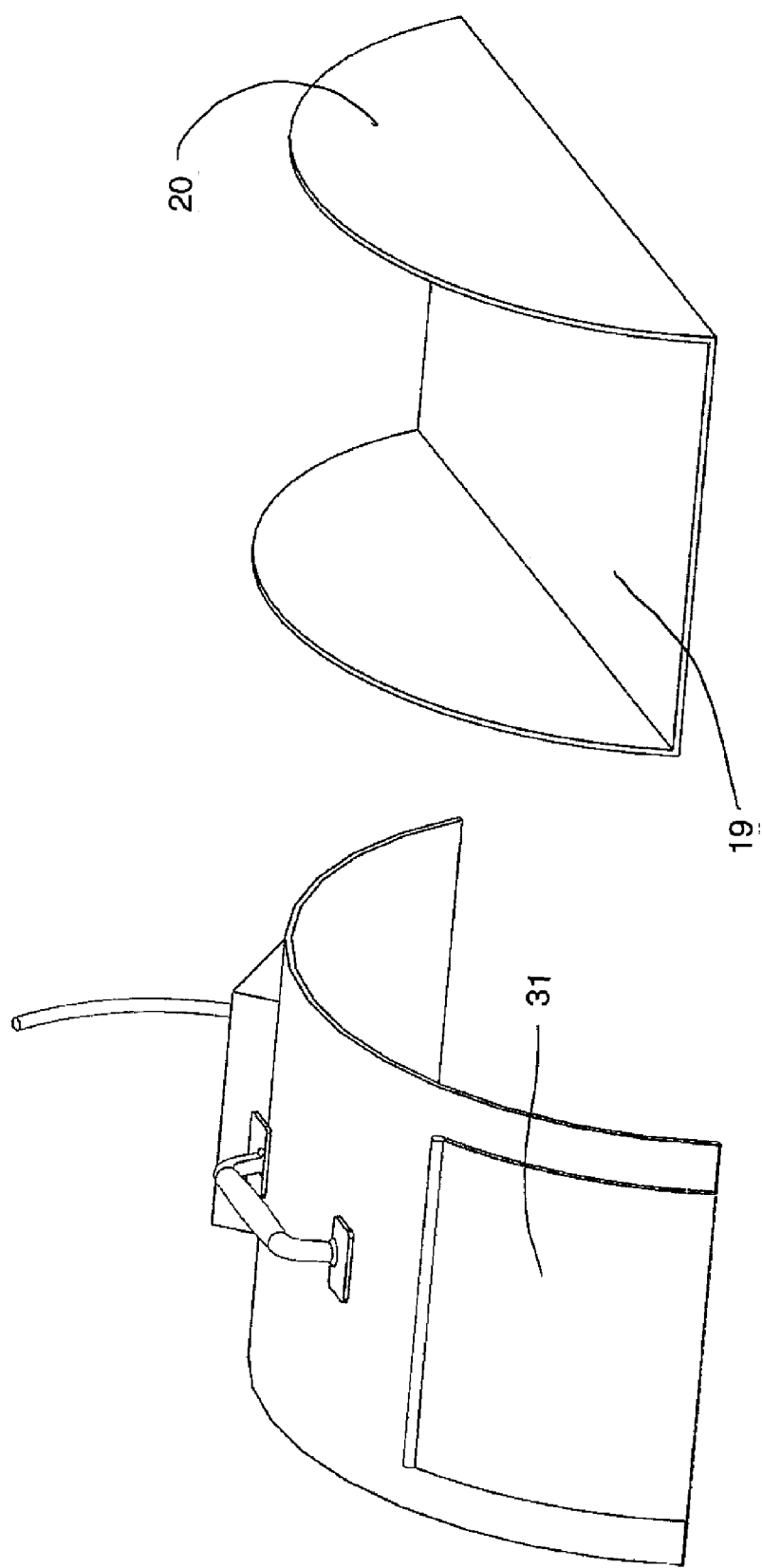
FIG. 3 is an isometric view of a second embodiment of dryer according to the invention.
Figure 4:
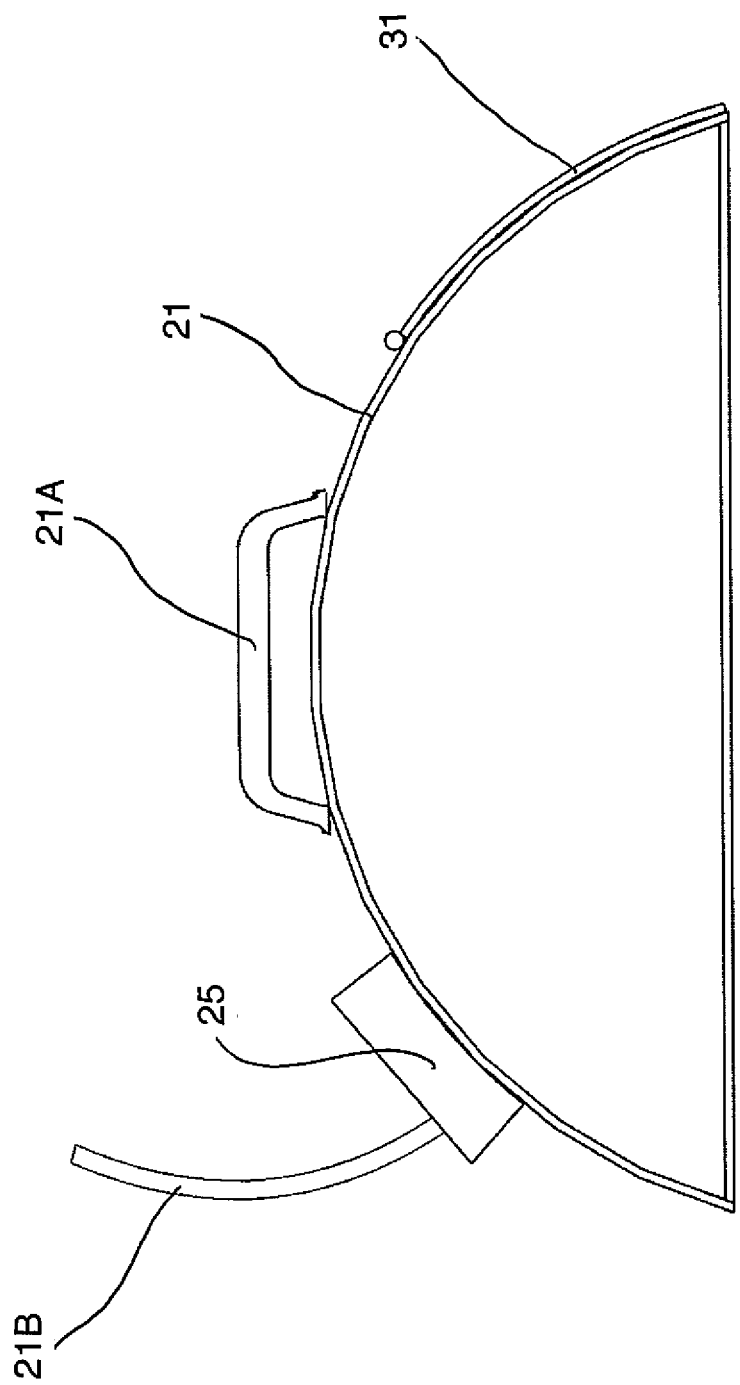
FIG. 4 is a side elevational view of the cover of FIG. 3.
Figure 5:
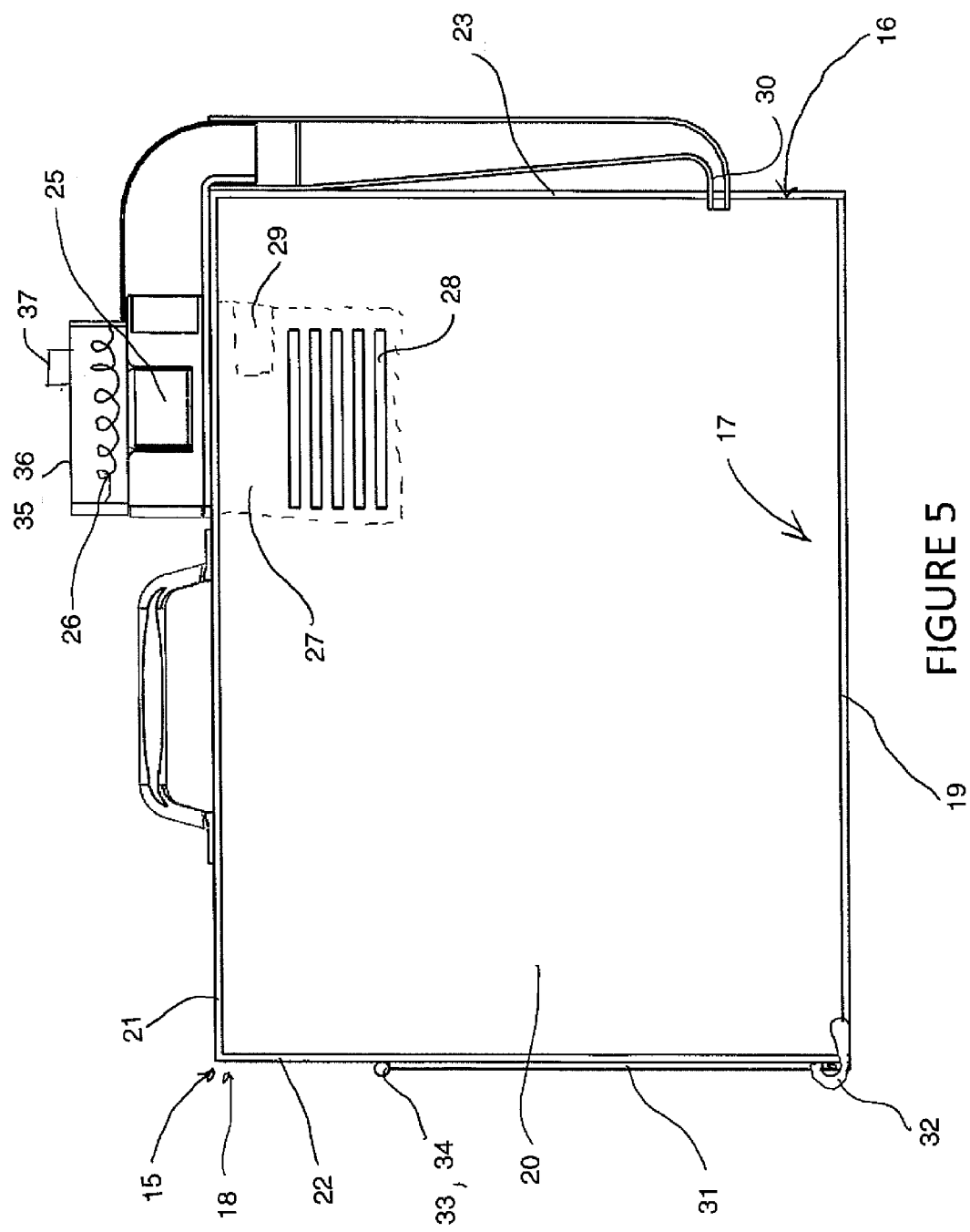
FIG. 5 is a cross-sectional view of the dryer of FIG. 2.

FIG. 1 shows a farrowing area for a pregnant sow, which may be provided by a specific farrowing crate 10 for each show including a central frame 11 for confining the sow and two side areas 12 for the piglets after birth and up to weaning. The side area 12 includes a floor 13 which may include a heated area or mat and a confining wall 14.

Within the area 12 is provided a drying container 15 for receiving one or up to four of the piglets after birth of the piglets while the piglets are in a wet condition from the birthing process. The container comprises a housing 16 dimensioned to receive the piglets standing or lying side by side along the length of the container so that a typical container would have dimensions of 18 inches by 12 inches and 12 inches high.

After birth attended by the worker, the piglets, which typically are born in batches of 2 to 4 are located in the container by the worker immediately after the birth by the worker lifting them manually into the container and placing them side by side within the container. In order to enable the piglets to be easily inserted into the container, there is provided an opening for manual insertion of the piglets.

Thus the container includes a base portion 17 and a cover portion 18 where the cover portion can be lifted for manual insertion of the piglets or can include a door through which piglets can be inserted. The base portion includes bottom or floor 19 and confining walls 20 which as shown include two side walls so that the piglets are dropped onto the floor and held confined by the sides. The separate cover includes a top wall 21 and front and rear walls 22 and 23. The cover can include a transparent panel 24 to allow viewing of the piglets.

For simple operation, there is provided a plurality of separate base portions 17 each arranged to be located in a separate farrowing area and associated with a single cover portion 18 which is movable from one farrowing area to another with the worker as births occur in the farrowing sows. The cover portion includes components for generating heat and air movement including a fan 25 and a heating element 26 which cooperate with designed vents 28 to provide the best drying air flow. A duct 27 may be provided to return the air from the vents to the intake of the fan with a humidity control 29 to ensure the best air condition for the drying action. The fan is arranged with nozzles 30 or vents to direct the air onto the piglets to provide sufficient air movement to break down the film or skin which is present on the piglet. The cover includes a handle 21A in the top wall 21 and an electrical coupling 21B for supplying power to the drying components from a suitable supply within the farrowing area.

The cover 18 includes a door 31 at the front with a hinge 33 shown at the top but at any suitable location and a latch 32 shown at the bottom but again at any suitable location. The latch 32 is operated by a control unit 35 which includes a timer 36 operable by a switch 37.

The piglets are therefore confined within the container for drying and, after a time period determined by the timer 36 and switch 37 to be sufficient to dry the piglets from the wet condition, the piglets are released from the container by release of the latch 32 and by the door being opened by a spring 34 or by the piglets pushing their way out for example to escape the vigorous air flow.

As shown in FIG. 1, the closable opening at the door 31 is directed toward the nipples of the lying sow in the farrowing area.

The cover and the latched door 31 may be arranged so that when the piglets are placed into the container by the worker they cannot enter or re-enter the container since the door is closed and the cover is in place. Thus the container may not be intended to operate as a warm area for the piglets to return after they have been released from drying. Thus the worker will typically remove the cover portion after the drying action is competed for all piglets in the litter. The drying device is not intended to be a heated comfort zone for the piglets. Its main purpose is to dry and direct them to the nipples. Piglets may choose to stay inside the device. In such cases, the worker would typically remove and direct them manually to the nipples before putting further newborn ones inside for drying.

The timer has different modes to take into account the number of piglets to dry and each mode is arranged to start the system with the proper configuration of the fan and humidity control to efficiently dry the piglets.

Figure 6:
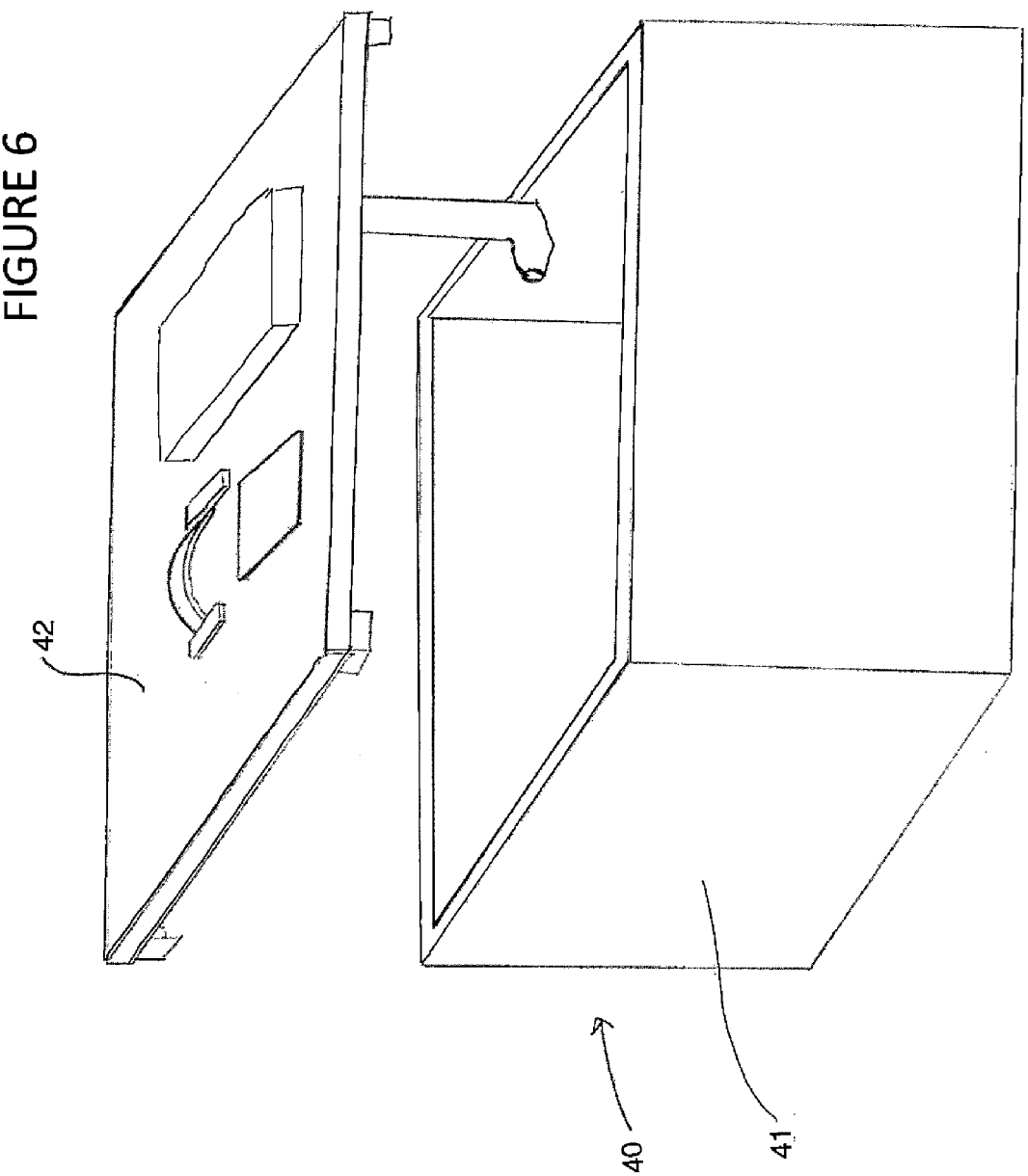
FIG. 6 is an isometric view of a modified arrangement having a container with four walls in the pen where the operating components are provided on a component which simply forms the cover.

FIG. 6 shows container 40 with four walls 41 in the pen where the operating components are provided on a component which simply forms the cover 42. Thus in this arrangement the worker lifts the piglets into the open top of the base when born and removes them after a period of time for drying. This arrangement does not require control of the release by a timer or sensing system, but may provide a timer or sensing indication to the piglets when the dried condition is detected or expected.

Figure 7:
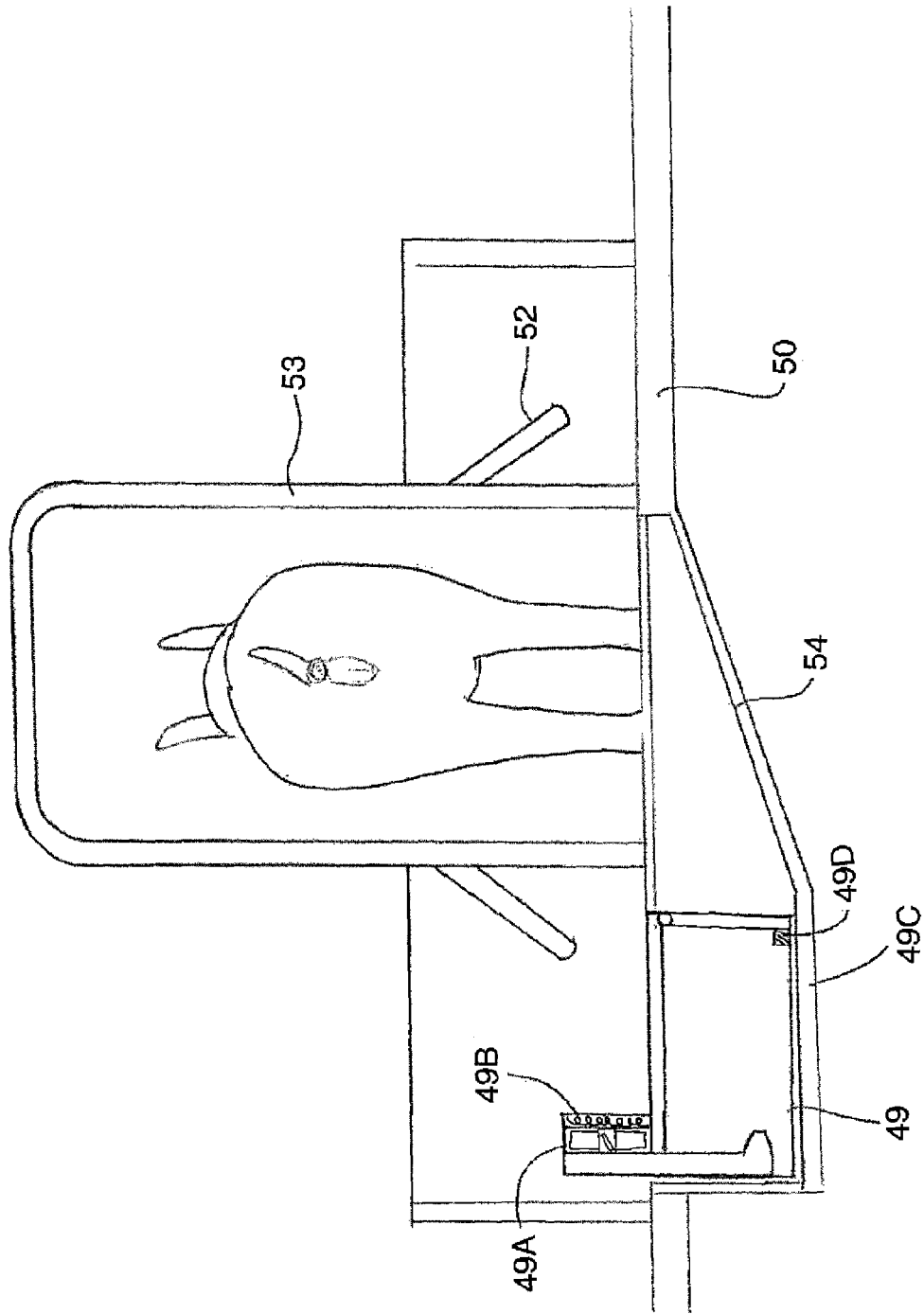
FIG. 7 is an end elevational view of a modified arrangement where the drying container is mounted under a floor of the pen so that the piglets at birth slide into the container automatically for drying.

FIG. 7 is an end elevational view of a modified arrangement where the drying container 49 with a fan 49A and heater 49B is mounted temporarily under a floor 50 of the pen 51 having anti-crush bars 52 on a frame 53 which confines the sow. A slide surface 54 is located at the rear of the pen so that the piglets at birth slide into the container 49 automatically for drying. The piglets can be removed manually by the worker when dried. This arrangement is thus used in conjunction with a system in which there is provided a compartment 49C at a level below the pen floor into which the container 49 is placed temporarily when required so that the piglets slide after birth and which protects them until they are ready to return to the pen to access the sow. Thus in the present arrangement, the piglets can automatically enter the drying device 49 and are allowed to leave only once they are dry. The system can include a detector 49D which operates to start automatically as the piglets enter.

Figure 8:
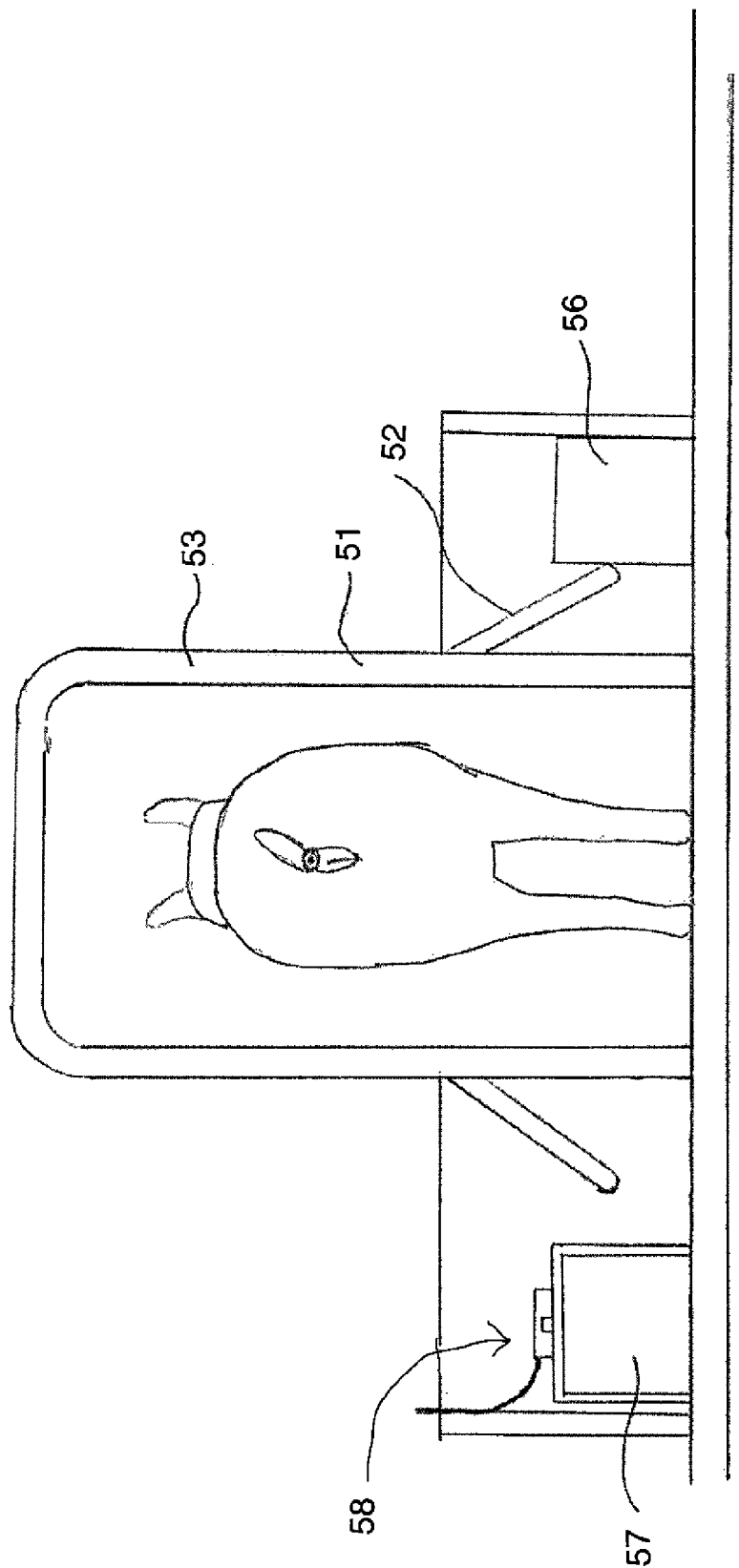
FIG. 8 is an end elevational view of a modified arrangement where the there are two base portions one on each side of the sow where the cover can be moved to one side or the other as required.

FIG. 8 is an end elevational view of a modified arrangement where the there are two base portions 56, 57 one on each side of the sow where the cover 58 can be moved to one side or the other as required.

Figure 9:
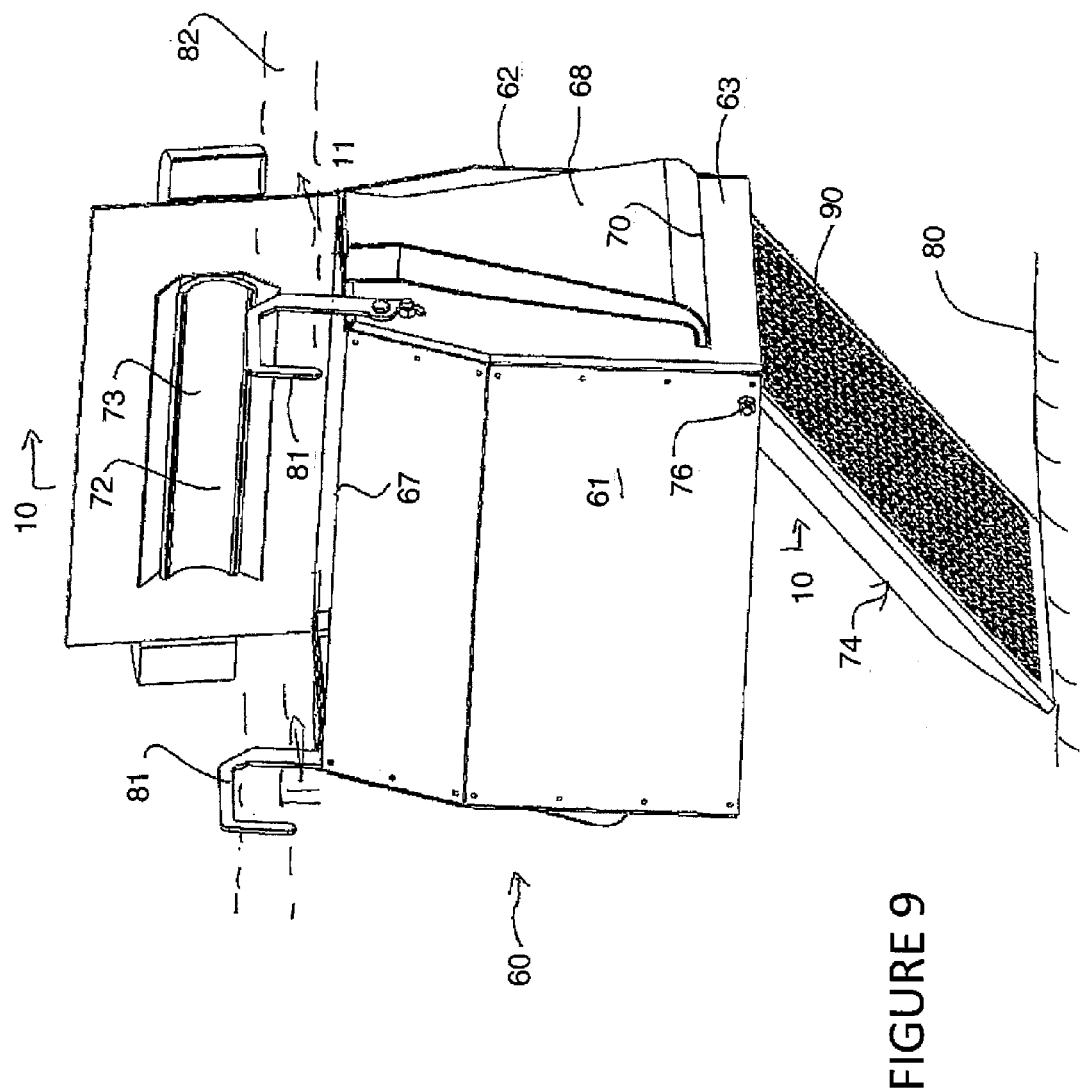
FIG. 9 is an isometric view of a further embodiment of a drying container according to the present invention.
Figure 10:
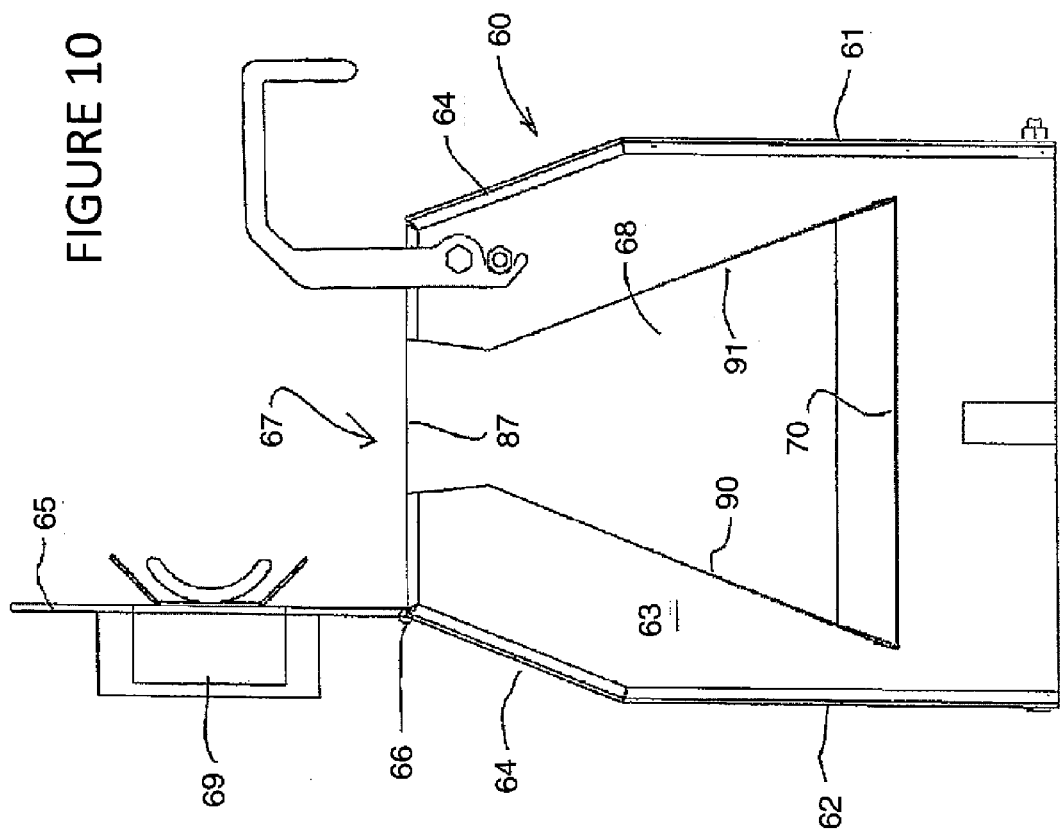
FIG. 10 is a transverse cross-sectional view along the lines that 10-10 of FIG. 9 showing the floor panel in the closed position.
Figure 11:
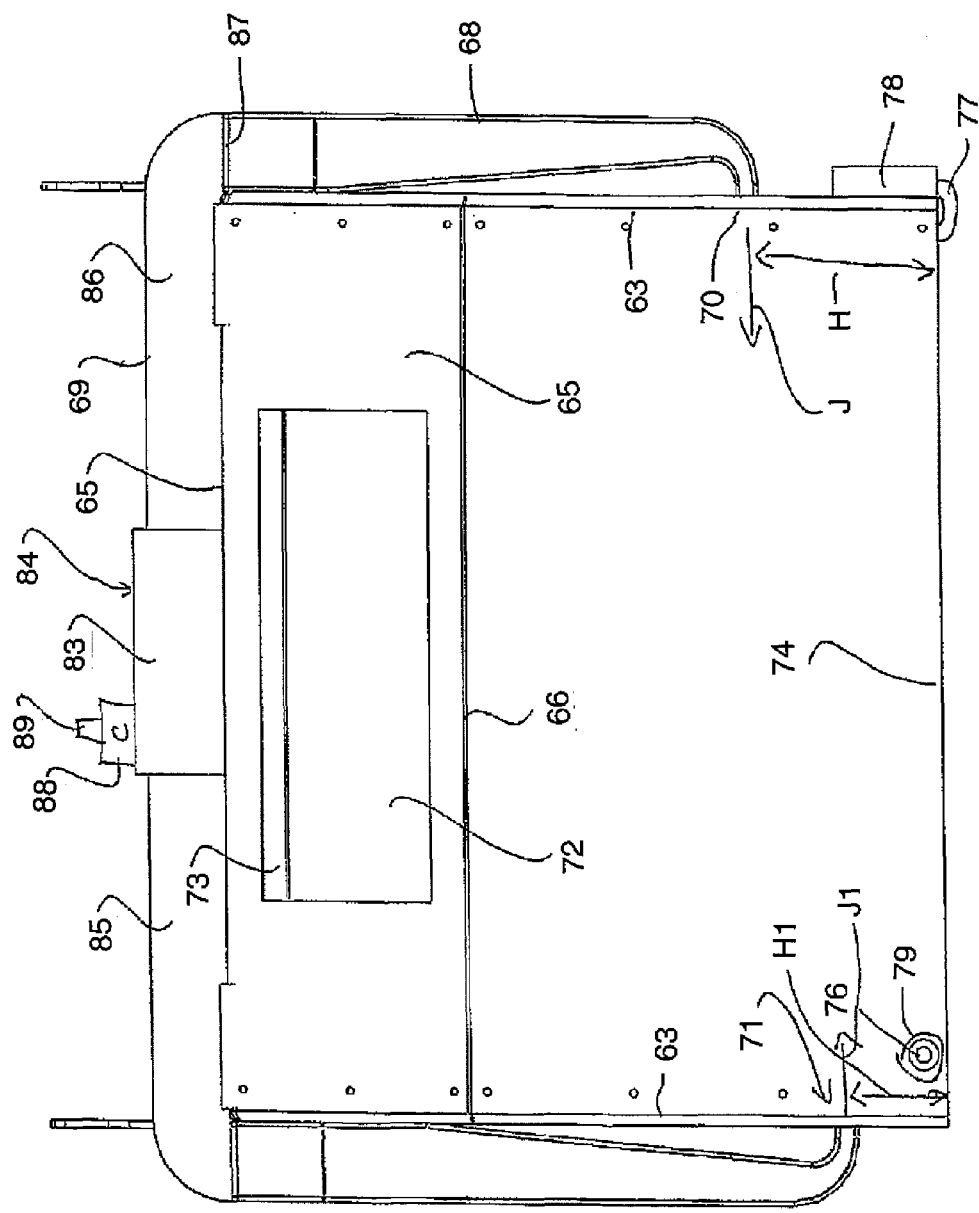
FIG. 11 is a transverse cross-sectional view along the lines that 11-11 of FIG. 9 showing the floor panel in the closed position.

Turning now to the arrangement shown in FIGS. 9, 10 and 11 there is provided a container 60 which includes upstanding sidewalls defining a rectangular interior including a video wall 61, a front wall 62 and the two side walls 63. The front and rear walls include an inwardly inclined upper wall section 64 at least one of which forms a transparent panel allowing the piglets within the container to be viewed during the drying action.

A top cover panel 65 is pivoted at a hinge 66 at the top of one of the walls so that the cover panel can be moved from a closed position lying across the top opening 67 of the container to a closed position in which the container is a fully closed.

Each side wall 63 includes a duct 68 which carries air from an air supply 69 to an injection nozzle 70, 71.

On the on the side of the top panel 65 is provided a radiant heat member 72 in the form of a lamp or a ceramic heating panel including a reflector 73 which directs radiant heat downwardly from the upper panel 65 toward the floor 74.

The container 60 thus includes an opening 75 defined by the open bottom of the container closable by a closure member defined by the floor panel 74 for release of the piglets. Thus the closure member for release of the piglets comprises the floor panel 74 which is hinged at one side and a hinge pin 76 and is held in a retracted or closed position by a latch construction 77 operable by a solenoid or other drive device 78 which is operated to release the latch when the drying process is completed. A spring 79 at the pin 76 provides a lifting force on the floor panel 74 so that it tends to return to the closed position when the weight of a piglet is removed from the floor panel by the piglet exiting the container. In this way, the piglet when placed into the container remains in place on the floor panel with the floor panel in the raised position held by the latch 77. When the drying action is complete the latch 77 is released by the control 78 so that the weight of the piglet drives the floor panel downwardly to rest on a floor 80 of the farrowing pen. The dimensions of the container including particularly the size of the floor panel is arranged so that the piglet is lowered relatively slowly by its weight to a position in which the floor panel is inclined allowing the piglet to slide comfortably to the floor 80.

These side panels 63 each include a hanging bracket 81 which loops over a rail 82 at one side of the farrowing pen. In this way the worker can carry the container by a suitable handle to the required farrowing pen, can place the container onto the side wall with the top opening 67 at a suitable height to receive the piglets on the floor panel 74 at a suitable height from the floor 80 to allow the piglets to safely slip to the floor when released.

The container includes a radiant heating member 72 for applying radiant heat to the piglets within the container.

The container includes an air movement system comprising a fan 83 on the top panel 65 which drives air from an intake 84 into two ducts 85 and 86 extending along the top panel 65 to the side ducts 68 on the side walls of the container. A mating coupling 87 of the ducts 85 and 86 and the ducts 68 ensures that the air is transported through the duct 68 when the container is closed. A control system 88 operated by a switch 89 provides control to be found 83 onto the latch 78 and to the radiant heat system 72. The control system 88 asked to control the radiant heating member which is arranged to apply said radiant heat to the piglets in the container after the air movement is halted.

The fan 83 comprises a simple fan for air movement so that the air directed through the nozzles 70 and 71 is unheated. The radiant heating member is arranged to apply radiant heat to the piglets in the container and the air in the air movement is un-heated.

The air movement system comprises at least one nozzle 70, 71 arranged for directing air across the container from the end walls 63 at a height H, H1 to intersect the piglets on a floor of the container.

In order to provide the best drying action there is preferably at least two nozzles 70, 71 arranged at different heights H, H1 relative to the floor. As best shown in FIG. 10, the duct 68 has diverging sidewalls 90, 91 which extend outwardly from the upper mating opening 87 to the nozzle 70 in the form of a slot extending substantially across the full width of the end wall 63. This form of the air into a blade of air in a jet J, J1 passing across the container from one side to the other side directed across the floor 74. The heights of the nozzles are arranged so that the jets J, J1 intersect the animal on the floor panel 74 whether the animal is standing or lying. The container includes a perforated floor at the floor panel 74 as indicated at 90. In this way the air movement exits through the floor perforations and acts to dry the floor.

In operation with the container suspended from the side rail of the farrowing pen, the top cover is opened and the piglet or piglets which have just been born are placed into the container by the worker through the open top. The worker then actuates the switch 89 to commence a timing process which controls the fan 83 to drive the air through the nozzles 70, 71 to effect the drying action. During this drying action heat can be applied by the radiant heat system 72 to maintain the body temperature of the piglet against cooling by the drying action. After the drying action by the air jet is completed, the latch 78 is remained closed holding the floor panel in the raised position while the air movement is halted and the radiant heat applied. This period again is timed by the control system 88 until it is determined that the temperature of the piglet is raised sufficiently to enable her to feel comfortable with its body temperature at all close to normal. After this period of time of the heating action, the latch 78 is operated to release the piglet to the floor 80. After the piglet moves away from the floor panel, the spring 79 acts to retract the floor panel to the closed position and the latch 77 reengages.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for raising piglets comprising:
   providing a plurality of farrowing pens each for receiving a pregnant sow in a hog husbandry barn;
   providing a container for receiving at least one of a plurality of piglets after birth of the piglets while the piglets are in a wet condition from the birthing process;
   causing said at least one of said plurality of piglets to be located in the container;
   applying drying air movement to said at least one of said plurality of piglets within the container sufficient to cause drying of said at least one of said plurality of piglets from the wet condition;
   maintaining said at least one of said plurality of piglets confined with the container temporarily until substantially dried from the wet condition;
   and releasing said at least one of said plurality of piglets from the container into the farrowing pen;
   wherein a closure member for release of the piglets comprises a floor panel.

2. The method according to claim 1 wherein there is provided a control system operable to cause said one or more piglets to be released from the container after a time period determined to be sufficient to dry said one or more piglets from the wet condition.

3. The method according to claim 1 wherein the container includes a latch operable on the closure member when said one or more piglets is dried for release of the piglets.

4. The method according to claim 1 wherein there is provided a removable cover portion which includes components for generating said air movement.

5. A method for raising piglets comprising:
   providing a plurality of farrowing pens each for receiving a pregnant sow in a hog husbandry barn;
   providing a container for receiving at least one of a plurality of piglets after birth of the piglets while the piglets are in a wet condition from the birthing process;
   causing said at least one of said plurality of piglets to be located in the container;
   applying drying air movement to said at least one of said plurality of piglets within the container sufficient to cause drying of said at least one of said plurality of piglets from the wet condition;
   maintaining said at least one of said plurality of piglets confined with the container temporarily until substantially dried from the wet condition;
   and releasing said at least one of said plurality of piglets from the container into the farrowing pen;
   wherein the air movement system is arranged so that air velocity and turbulence of the air act to break a thin skin layer present on said at least one of said plurality of piglets from the birthing process.

6. The method according to claim 5 wherein the air movement system comprises at least one nozzle arranged for directing air across the container at a height to intersect the piglets on a floor of the container.

7. The method according to claim 5 wherein said at least one nozzle comprises at least two nozzles arranged at different heights relative to the floor.

8. The method according to claim 5 wherein said at least one nozzle comprises a slot extending across an upstanding wall of the container.

9. The method according to claim 5 wherein there is provided a control system operable to cause said one or more piglets to be released from the container after a time period determined to be sufficient to dry said one or more piglets from the wet condition.

10. The method according to claim 5 wherein the container includes a latch operable on the closure member when said one or more piglets is dried for release of the piglets.

11. The method according to claim 5 wherein there is provided a removable cover portion which includes components for generating said air movement.

12. A method for raising piglets comprising:
    providing a plurality of farrowing pens each for receiving a pregnant sow in a hog husbandry barn;
    providing a container for receiving at least one of a plurality of piglets after birth of the piglets while the piglets are in a wet condition from the birthing process;
    causing said at least one of said plurality of piglets to be located in the container;
    applying drying air movement to said at least one of said plurality of piglets within the container sufficient to cause drying of said at least one of said plurality of piglets from the wet condition;
    maintaining said at least one of said plurality of piglets confined with the container temporarily until substantially dried from the wet condition;
    and releasing said at least one of said plurality of piglets from the container into the farrowing pen;
    wherein the container includes a radiant heating member for applying radiant heat to said one or more piglets within the container.

13. The method according to claim 12 wherein the radiant heating member is arranged to apply said radiant heat to said one or more piglets in the container after the air movement is halted.

14. The method according to claim 12 wherein the radiant heating member is arranged to apply said radiant heat to said one or more piglets in the container and the air in the air movement is un-heated.

15. The method according to claim 12 wherein there is provided a control system operable to cause said one or more piglets to be released from the container after a time period determined to be sufficient to dry said one or more piglets from the wet condition.

16. The method according to claim 12 wherein the container includes a latch operable on the closure member when said one or more piglets is dried for release of the piglets.

17. The method according to claim 12 wherein there is provided a removable cover portion which includes components for generating said air movement.

18. A method for raising piglets comprising:
providing a plurality of farrowing pens each for receiving a pregnant sow in a hog husbandry barn;
providing a container for receiving at least one of a plurality of piglets after birth of the piglets while the piglets are in a wet condition from the birthing process;
causing said at least one of said plurality of piglets to be located in the container;
applying drying air movement to said at least one of said plurality of piglets within the container sufficient to cause drying of said at least one of said plurality of piglets from the wet condition;
maintaining said at least one of said plurality of piglets confined with the container temporarily until substantially dried from the wet condition;
and releasing said at least one of said plurality of piglets from the container into the farrowing pen;
wherein the container includes a perforated floor such that the air movement exits through the floor and acts to dry the floor.

19. The method according to claim 18 wherein there is provided a control system operable to cause said one or more piglets to be released from the container after a time period determined to be sufficient to dry said one or more piglets from the wet condition.

20. The method according to claim 18 wherein the container includes a latch operable on the closure member when said one or more piglets is dried for release of the piglets.

21. The method according to claim 18 wherein there is provided a removable cover portion which includes components for generating said air movement.

22. The method according to claim 18 wherein the floor comprises a closure member for release of the piglets.

* * * * *